May 3, 1955     R. W. WALMER     2,707,500
ADJUSTABLE SUPPORT LEG FOR TILTING TABLE SAWS
Filed April 3, 1953     2 Sheets-Sheet 1

INVENTOR.
RUSSELL W. WALMER,
BY

McMorrow, Berman & Davidson
ATTORNEYS

May 3, 1955     R. W. WALMER     2,707,500
ADJUSTABLE SUPPORT LEG FOR TILTING TABLE SAWS
Filed April 3, 1953     2 Sheets-Sheet 2
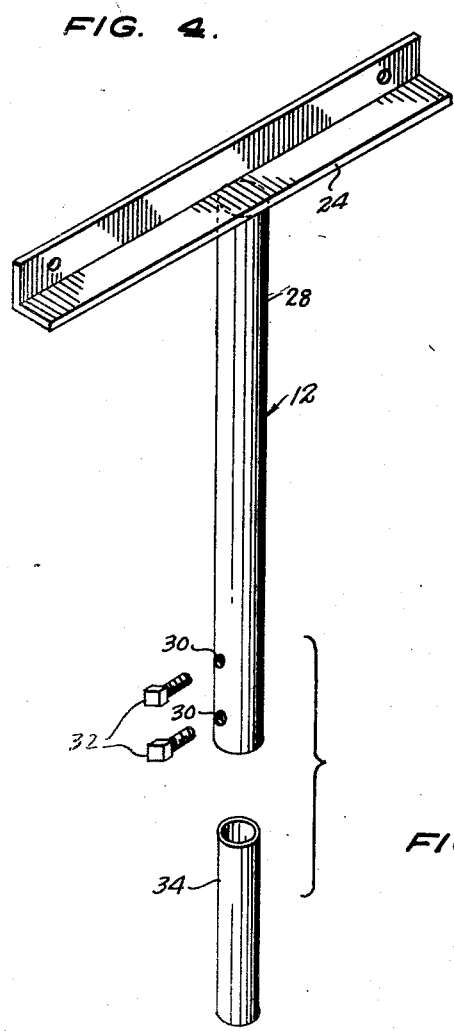
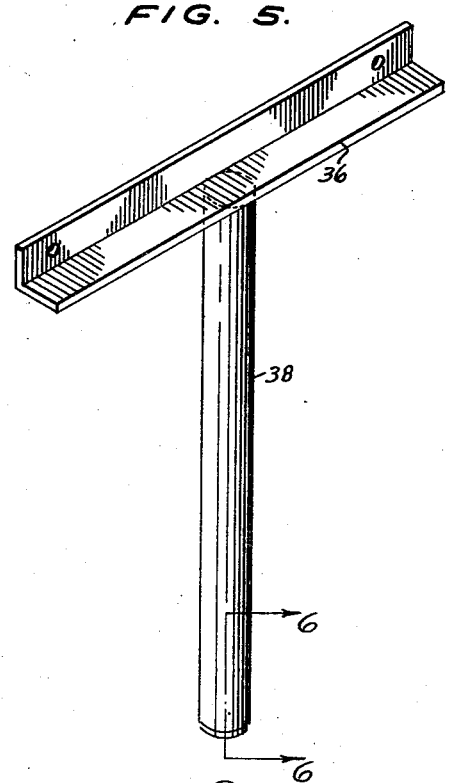
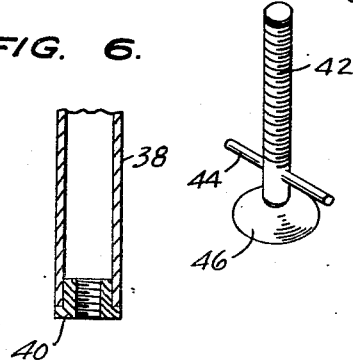
INVENTOR.
RUSSELL W. WALMER,
BY
McMorrow, Berman + Davidson
ATTORNEYS United States Patent Office 2,707,500
Patented May 3, 1955

2,707,500

ADJUSTABLE SUPPORT LEG FOR TILTING TABLE SAWS

Russell W. Wahner, New London, Wis.

Application April 3, 1953, Serial No. 346,709

3 Claims. (Cl. 143—36)

This invention relates to a support leg adapted to be secured to a conventional saw assembly of the tilting table type, and so formed as to permit the table of said saw to remain in a horizontal plane when adjusted out of its normal perpendicular relationship to the saw blade.

Ordinarily, in a saw of the type stated, any adjustment of the table whereby the table is tilted out of its normal perpendicularity to the saw blade results in disposition of the table in an inclined plane. As a result, the sawing of the stock becomes a more difficult operation than is true of sawing operations carried out while the table is horizontally disposed. This is so because the inclined position of the saw table makes it difficult to guide stock thereupon past the saw blade.

In view of the above, the main object of the present invention is to provide an adjustable support leg for a tilting table saw, which leg is adapted to be connected in such a manner to the table of the saw as to permit the table to be held horizontal even when adjusted out of perpendicularity to the plane of the saw blade, all other portions of the saw assembly including the main frame being tilted at an angle. Thus, in carrying out the invention, I keep the saw table horizontal at all times, and incline, instead, the saw frame, as distinguished from the practice heretofore followed, wherein the saw frame remained vertically disposed, and the table was adjusted to an inclined position.

A further object of importance is to provide a device of the character described that will be very inexpensive, capable of being attached swiftly and easily to the saw table, so formed as to interfere in no way with normal sawing operations, and adapted for connection to a tilting table saw without requiring modification or redesign of said saw.

Other objects will appear from the following description, the claims appended thereto, and from the annexed drawings, in which like reference characters designate like parts throughout the several views, and wherein:

Figure 4 is an enlarged, exploded perspective view of the support leg per se;

Figure 5 is a view similar to Figure 4, showing a modified form; and

Figure 6 is a detail sectional view taken substantially on line 6—6 of Figure 5.

Figure 1:
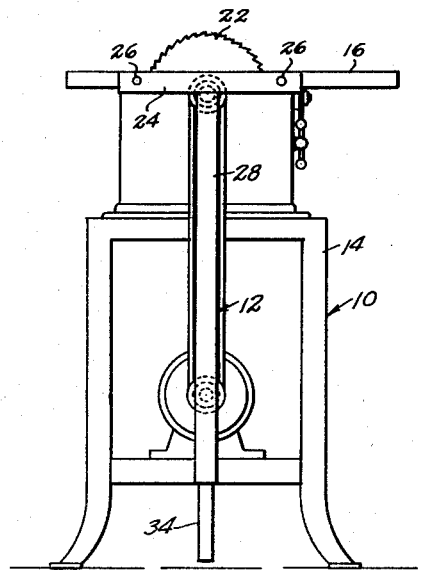
Figure 1 is a side elevational view of a tilting table saw equipped with an adjustable support leg formed in accordance with the present invention.

The reference numeral 10 has been applied generally in the drawing to designate a conventional power saw of the tilting table type. The reference numeral 12 has been applied generally to the adjustable support leg constituting the present invention.

The saw 10 includes the usual support frame 14, on which is pivotally mounted the tiltable table 16. Means for tilting the table includes a semi-circular, toothed segment 18 secured to the underside of the table 16, and meshing with a worm 20 manually rotated through the medium of a hand crank.

Figure 2:
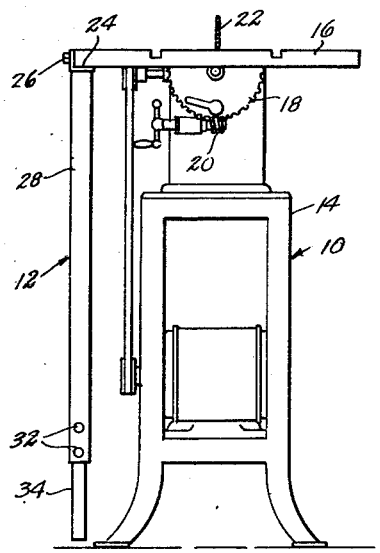
Figure 2 is an elevational view of the support leg and saw, taken from the right of Figure 1.

The saw blade has been designated by the reference numeral 22, and in Figure 2, it will be noted that the saw blade, normally, is disposed in a plane perpendicular to the plane of the saw table 16. Thus, under normal conditions the saw table will be disposed within a horizontal plane. However, if it is desired to make an angle cut in the stock to be sawed, the table 16 is normally adjusted about its pivot axis to an inclined position, in which it is out of perpendicularity to the blade 22, and is disposed at a selected angle relative to the plane of the blade. Under these circumstances, the sawing of the stock is made more difficult, since the guiding of the stock across the inclined surface of the table 16 is carried out awkwardly, particularly when the inclination of the saw table is quite pronounced.

In accordance with the present invention, the adjustable support leg 12 includes, at its upper end, a horizontally disposed cross head 24 preferably formed of angle iron material or the like. The cross head 24, at its opposite ends, has openings receiving connecting bolts 26, said bolts being threaded into complementary recesses formed in one end of the saw table 16.

Welded or otherwise rigidly secured to the midlength part of the cross head 24 is a depending, main leg member 28 of substantial length. The main leg member 28 is of tubular formation, and is formed open at its lower end. Adjacent its lower end, the member 28 is formed with longitudinally spaced, threaded openings 30 (Figure 4) receiving threaded adjusting bolts 32.

Telescoping within the open lower end of the main leg member 28 is an extension leg member 34.

It will be readily appreciated that by threading of a bolt 32 into a selected opening 30, the extension leg member 34 can be telescoped within the member 28 to a selected extent, thus to adjust the overall length of the support leg.

Thus, if the bolt 32 associated with the upper one of the openings 30 (viewed as in Figure 4) is the only bolt 32 used, the extension leg member 34 would be telescoped to a substantial extent within the member 28, thus to shorten the overall length of the support leg.

Obviously, the openings 30 could be so spaced as to cause the overall length of the support leg to be selected according to the particular angle to which the table 16 is to be tiltably adjusted.

Figure 3:
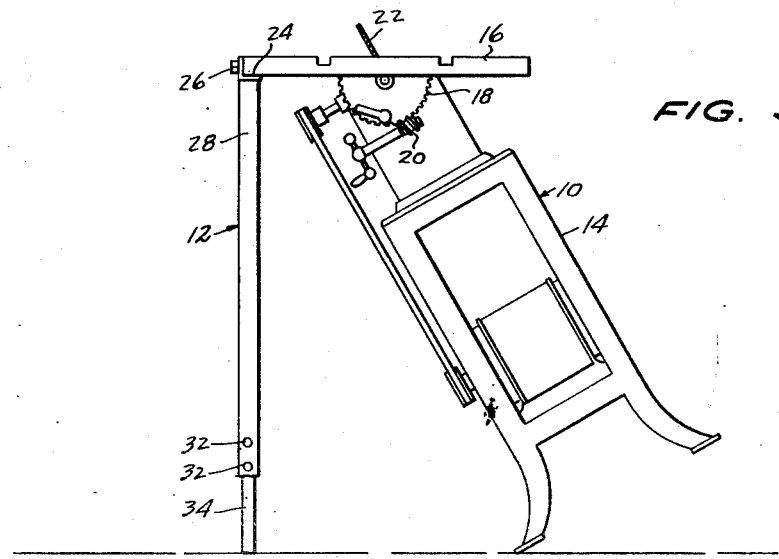
Figure 3 is a view similar to Figure 2, in which the saw table has been adjusted out of perpendicularity to the saw blade.

In any event, after adjustment of the support leg as to the length thereof, the saw frame can be tilted bodily in the manner shown in Figure 3. The saw table 16 will now be disposed out of perpendicularity to the plane of the blade 22, but will still be held in a horizontal plane, thereby to facilitate the sawing of the stock.

Referring now to Figure 5, there is here shown a modified form wherein the cross head 36 is formed substantially identically to the cross head 24, said cross head 36 being rigid with the upper end of a main leg member 38. Leg member 38, at its lower end, has fixedly mounted therein a shouldered sleeve 40 formed with a threaded, axial bore in which is engageable the complementarily threaded upper end of an extension leg 42. Extension leg 42, adjacent its lower end, has a cross pin 44 extended therethrough, to provide a handle whereby the leg 42 can be conveniently rotated. At its lower end, the extension leg member 42 is swiveled upon a foot 46.

The form of the invention shown in Figure 5 may be preferable in a commercial embodiment of the device, since it facilitates the longitudinal adjustment of the support leg, permitting said adjustment to be carried out merely by rotation of the handle 44 to a selected extent, rather than by insertion or removal of selected bolts 32.

It is believed to be an important characteristic of the invention that although the device can be constructed at relatively low cost, it is nevertheless efficiently adapted to permit the same to be used as an adjustable support for a tilting table saw, with the construction which I have devised being such as to permit the saw to be tilted bodily while the table 16 thereof remains in a horizontal plane. Further, the T-shaped formation of the device is such as to allow the upper end portion of the device to be readily and securely attached to the saw table 16, without interfering in any way with sawing operations, whether the saw table 16 is in the position shown in Figure 2 or in the tilted position shown in Figure 3.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. The combination, with a saw including a supporting-surface-engaging frame adapted to be bodily tilted to a position inclined from the vertical, a saw blade mounted on the frame to tilt therewith to a correspondingly inclined position, and a saw table pivotally connected to said frame so as to remain horizontal in selected positions to which the frame is tilted, of leg means rigid with said table and depending therefrom a distance sufficient for engagement of said means at its lower end with a frame-supporting surface at a location spaced from the surface-contacting portion of the frame, said leg means and frame defining cooperating, spaced leg structures on which the table is horizontally supported.

2. The combination, with a saw including a supporting-surface-engaging frame adapted to be bodily tilted to a position inclined from the vertical, a saw blade mounted on the frame to tilt therewith to a correspondingly inclined position, and a saw table pivotally connected to said frame so as to remain horizontal in selected positions to which the frame is tilted and projecting laterally at at least one side thereof beyond the corresponding side of the saw frame, of leg means rigid with the laterally projecting part of said table and depending therefrom a distance sufficient for engagement of said means at its lower end with a frame-supporting surface at a location spaced from the surface-contacting portion of the frame, said leg means and frame defining cooperating, spaced leg structures on which the table is horizontally supported.

3. The combination, with a saw including a supporting-surface-engaging frame adapted to be bodily tilted to a position inclined from the vertical, a saw blade mounted on the frame to tilt therewith to a correspondingly inclined position, and a saw table pivotally connected to said frame a substantial distance inwardly from one side of the table so as to remain horizontal in selected positions to which the frame is tilted, said saw table projecting laterally at said side beyond the corresponding side of the saw frame, of leg means rigid with said laterally projecting side of the table and depending therefrom in perpendicular relation to the plane of the table a distance sufficient for engagement of said means at its other end with a frame-supporting surface at a location spaced from the surface-contacting portion of the frame, said leg means and frame defining cooperating leg structures spaced apart at their upper and lower ends, on the upper ends of which structure the table is horizontally supported in all positions to which the frame and blade are tilted.

References Cited in the file of this patent

UNITED STATES PATENTS

| | | |
|---|---|---|
| 516,346 | Cardarelli | Mar. 13, 1894 |
| 1,586,797 | Gulliford | June 1, 1926 |
| 1,593,079 | Jaeger | July 20, 1926 |
| 2,188,827 | Bradfield | Jan. 30, 1940 |
| 2,523,680 | Christie | Sept. 26, 1950 |